United States Patent

Hamaekers

[11] Patent Number: 5,966,996
[45] Date of Patent: Oct. 19, 1999

[54] ANNULAR VIBRATION DAMPING MACHINE ELEMENT

[75] Inventor: Arno Hamaekers, Gorxheimertal-Unterfl., Germany

[73] Assignee: Firma Carl Freudenberg, Weinheim Federal Republic of Germany, Germany

[21] Appl. No.: 08/287,448

[22] Filed: Aug. 8, 1994

[30] Foreign Application Priority Data

Aug. 21, 1993 [DE] Germany .............................. 43 28 153

[51] Int. Cl.$^6$ .................................................. F16F 15/12
[52] U.S. Cl. .............................................. 74/574; 464/180
[58] Field of Search .............................. 74/574; 464/180, 464/89

[56] References Cited

U.S. PATENT DOCUMENTS

| | | |
|---|---|---|
| 2,723,573 | 11/1955 | Dillman ..................................... 74/574 |
| 3,878,695 | 4/1975 | Pitner . |
| 5,299,468 | 4/1994 | Withers ..................................... 74/574 |

FOREIGN PATENT DOCUMENTS

| | | |
|---|---|---|
| 3 535 859 | 4/1987 | Germany .................................. 74/574 |
| 36 12 370 | 10/1987 | Germany . |
| 2 146 408 | 4/1985 | United Kingdom ...................... 74/574 |
| 2 162 611 | 2/1986 | United Kingdom ...................... 74/574 |

*Primary Examiner*—Charles A. Marmor
*Assistant Examiner*—Mary Ann Battista
*Attorney, Agent, or Firm*—Kenyon & Kenyon

[57] ABSTRACT

An annular machine part comprising at least two metal machine elements which are separated from one another by a viscoelastic rubber layer and which have surfaces extending substantially parallel to one another. At least one machine element is joined to the rubber layer, which is connected to a separately produced extension piece projecting from a machine element.

4 Claims, 2 Drawing Sheets

ANNULAR VIBRATION DAMPING MACHINE ELEMENT

The invention relates to an annular machine part in which at least two metallic machine elements having surfaces extending substantially parallel to one another are separated from each other by a rubber layer.

Machine parts of this kind are generally known, and have been utilized as torsional vibration dampers. DE-OS 36 12 370, for example, discloses a vibration damper of this general type for use especially with the crankshaft of an internal combustion engine, in which both a hub ring and a flywheel ring consist of a deep drawn sheet-metal part. The flywheel ring is configured integrally and continuously, and comprises a belt pulley and a transmitter wheel with a toothed outer periphery for an electrical/electronic measurement apparatus. Unfortunately, the drawn flywheel ring is deficient both in terms of production engineering and cost. Dimensionally accurate flywheel rings can be produced with close tolerances to allow both precise guidance of the belt as well as accurate scanning, for example, of the rotational speed of the vibration damper, but only with considerable effort.

There remains a need to further develop an annular machine part of the known type such that the component is comparatively easier and less expensive to produce.

SUMMARY OF THE INVENTION

In the present invention, provision is made for at least one machine element to be joined on an exterior surface of a viscoelastic layer to a separately produced extension piece projecting from one of the machine elements. The two machine elements that are supported against one another on the viscoelastic layer can, for example, be a hub ring and a flywheel ring. In this embodiment, the separately produced extension piece can be a belt pulley that is fastened either to the flywheel ring or to the hub ring. If the two machine elements are a hub ring and a belt pulley, an extension piece in the form of a flywheel ring can be fastened to the belt pulley. With the separately produced extension piece, this component can be optimally adapted to the particular circumstances of the application. The connection between the extension piece and one of the machine elements can be made either positively or non-positively. For example, the extension piece can be joined to the adjacent machine element with a press fit, or by other fastening means.

According to an advantageous embodiment, the extension piece can be annular in shape. The rotational symmetry of such components provides a level of built-in concentricity that make them especially well-suited to many environments. The extension piece is therefore preferably associated concentrically with at least one of the machine elements. Association of the extension piece with one of the machine elements in a manner prohibiting relative movement therebetween produces consistently good operating characteristics during the entire service life of the device.

According to an advantageous embodiment, provision can be made for the extension piece to be arranged on the surface of the machine element perpendicularly opposite the rubber layer, and to be fastened thereto. This configuration reliably eliminates undesired relative wobbling movements of the machine elements relative to one another. Preferably, the centers of gravity of the machine elements used, and of the extension piece, are arranged in a common radial plane of the annular machine part.

The extension piece can be joined to one of the machine elements by a variety of methods, e.g., welding. The weld can be made as a spot weld or as a resistance pulse welding. The advantage of such welding methods is that the heating of the parts that are welded to one another is spatially limited, thereby minimizing the thermally-induced distortion of the components so that there is no need for later re-shaping after one of the machine elements is joined to the extension piece. The advantage of a weld as opposed to a press fit of the extension piece onto one of the machine elements lies in the fact that welding presents a simpler production process. There is no need to subject the parts being joined to one another to different heat treatments before they are combined in order to be able to join them. A weld can economically be made automatically on a volume-production basis.

The extension piece and/or at least one machine element can be hoop-shaped and produced from a rod material, by connecting the ends of the rod to one another. Rod material is easy and economical to process. For example, the processing of the material can be accommodated by a single machine tool that is configured as a stamping and bending machine. To produce a positive connection between the ends of the rod, one of the ends of the rod material can be provided with a projection extending in the peripheral direction which engages positively into a congruently shaped recess of the opposite rod end.

According to another embodiment, the ends of the rod can be welded to one another. The advantage of this approach lies in the fact that loads do not impair the durability of the joint regardless of the load direction. Both radial loads resulting from centrifugal force and axial loads and/or wobbling movements that may occur can easily be absorbed by the welded joint.

The surface of at least one of the machine elements can be carried past the extension piece, avoiding any abrupt change in direction. According to another embodiment, two surfaces of the machine elements, extending substantially perpendicular to one another, can be provided, and be carried past the extension piece so as to avoid any abrupt change in direction.

The annular machine part is produced by inserting a rubber layer in the clearance between two metal machine elements that are separated from one another and have surfaces extending substantially parallel to one another by any of a variety of known methods. For example, the viscoelastic layer and the machine elements can be joined to one another by vulcanization, or the rubber layer can be injected between the two machine elements.

To simplify production of the entire machine part, at least one of the machine elements can be joined to a separately produced extension piece rising above its surface after insertion of the rubber layer.

In order to eliminate tensile stresses within the rubber layer, at least one of the machine elements can be calibrated before it is joined to the extension piece. As a result, tensile and shear stresses within the rubber layer that can reduce service life are excluded, and the machine part has consistently good utilization characteristics over a long service life.

The machine element and/or the extension piece can be machined before they are joined to one another. The advantage here is that a suitable surface roughness of the mutually facing surfaces of machine element and extension can be produced on the basis of the method used to join the machine elements to the extension piece. Machining of this kind, which produces comparatively coarse surface roughness, is particularly suitable when the machine element and the extension piece are, for example, to be adhesively bonded to one another. The surface roughness ensures a good, durable bond between the adhesive and the adjacent components.

Various metallic materials, such as cast iron and steel, can be used to produce the machine element and the extension piece. These materials can be joined to one another using a resistance pulse welding method. This technique is best carried out by providing that the contact surface between the two components being welded to one another is as small as possible, preferably in the form of a point or a line. The temperature occurring in the region of these joining points, largely limited in extent to that region, is so high that the projections pass from the solid to the liquid state of matter, and weld to the material of the adjacent component. Distortion can be reliably eliminated by the fact that heat input to the components being welded is spatially limited. Reprocessing due to distortion is therefore unnecessary, which helps to provide simple, cost-effective production of the machine part.

The machine element and the extension piece can be processed with regard to their surface finish before being joined to one another. This makes it possible to achieve a surface roughness suitable for the particular joining method, in order to achieve the most durable joint possible.

BRIEF DESCRIPTION OF THE FIGURES

Two exemplary embodiments of a machine part constructed according to the principles of the invention are discussed in greater detail below, with reference to the attached FIGS. 1 to 3 in which.

DETAILED DESCRIPTION

Figure 1:
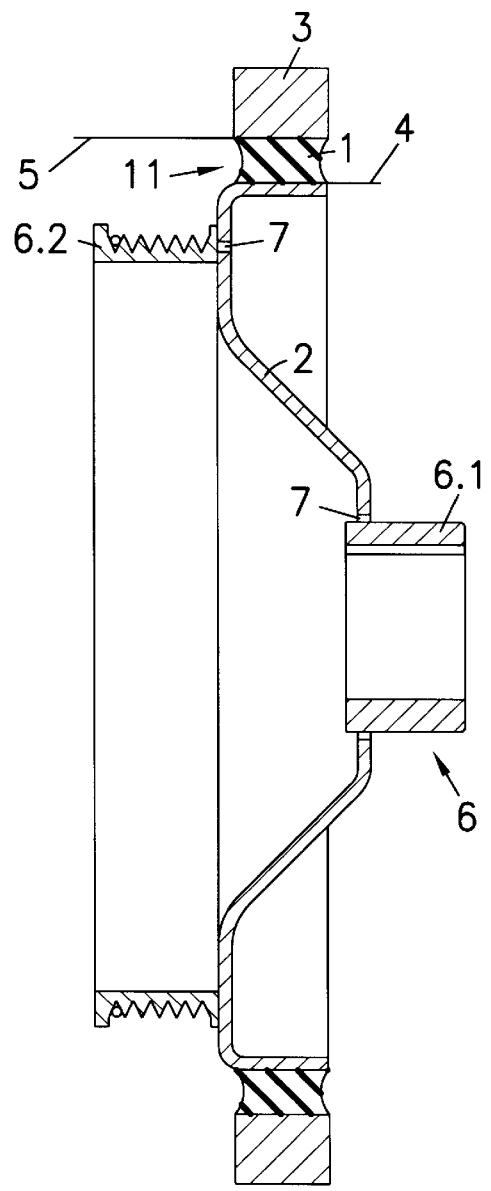
FIGS. 1 and 2 show two embodiments of the device schematically and in cross-section.

FIG. 1 shows an annular machine part that is configured as a torsional vibration damper. Two metallic machine elements 2 and 3 are provided for use as a hub ring and a flywheel ring respectively, and are supported against one another in a torsionally elastic manner by a rubber or viscoelastic layer 1. In this embodiment, viscoelastic layer 1 is adherently fastened along its radial inner and outer parallel surfaces 4 and 5 to the two machine elements hub ring 2 and flywheel 3. In this embodiment, the annular machine part hub ring 2 is provided with two extension pieces 6.1 and 6.2. First extension piece 6.1 forms a sleeve that can be nonrotatably fastened to a shaft 6. The second extension piece, also arranged hub ring 2, is a belt pulley. Both the first and the second extension pieces 6.1 and 6.2 are fastened to machine element 2 by a resistance pulse weld 7. Machine element 2 has, before it is joined to first extension piece 6.1, a delimiting surface on the inner peripheral side that contacts the first extension piece 6.1 substantially along a line. During welding, the projection of first machine element 2, tapering in a wedge shape towards first extension piece 6.1, melts and joins to the material of the sleeve. ST 37 and C 45, for example, can be used as materials. Second extension piece 6.2, configured as a belt pulley, can be fastened in a corresponding manner to first machine element 2, the belt pulley being joined in the region of its axial end surface to the radially extending end surface of first machine element 2.

Figure 2:
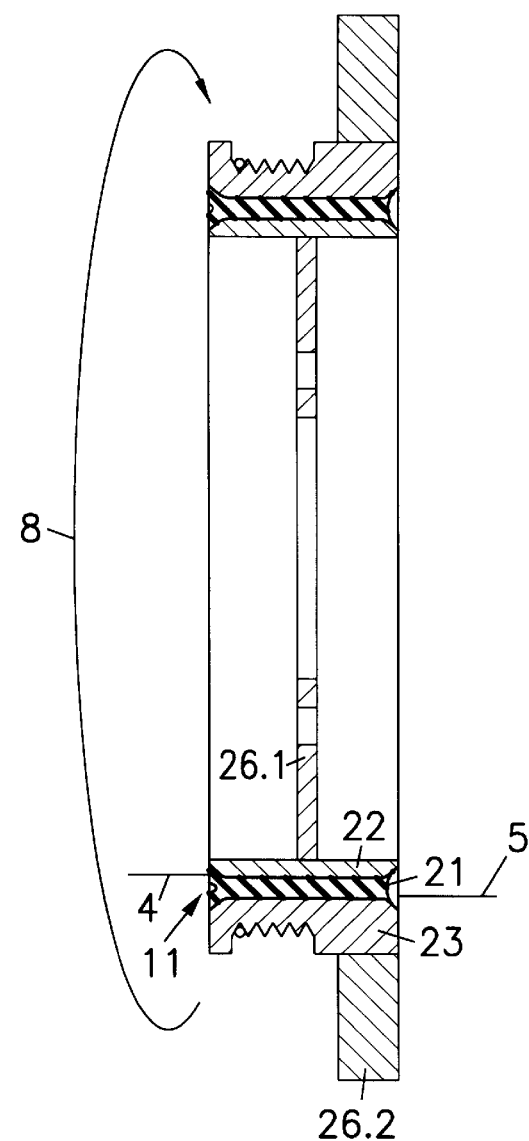

FIG. 2 shows a second embodiment comprising four individual parts joined to one another. Ring-shaped machine element 22, innermost in the radial direction, is surrounded at a radial distance by a second machine element 23 that is configured as a belt pulley. To damp torsional vibrations, clearance 11 between the two machine elements 22 and 23 is filled with a rubber layer 21. In this embodiment two separately produced extension pieces 26.1 and 26.2 are provided: the first extension piece 26.1 is provided to fasten the machine part to, for example, the crankshaft of an internal combustion engine, and forms part of the hub ring 22; the second extension piece 26.2, forming a flywheel ring, is pressed onto the outer periphery of second machine element 23.

Figure 3:
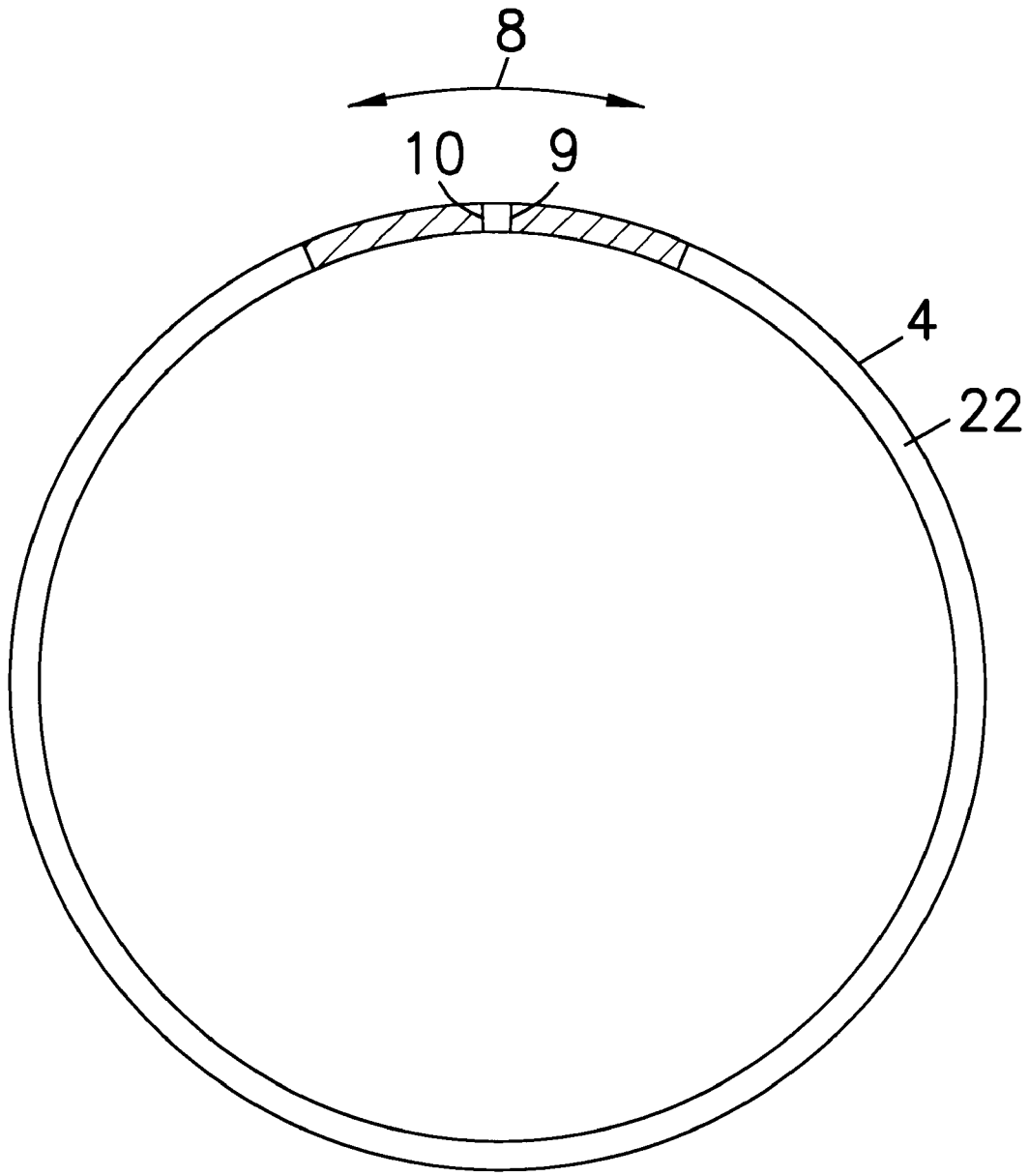
FIG. 3 shows a plan view of the first machine element from FIG. 2.

FIG. 3 is a plan view which shows first machine element 22 of FIG. 2. Machine element 22 is hoop-shaped and produced from a rod material. It is delimited in the peripheral direction 8 by ends 9, 10 that are welded to one another.

What is claimed is:

1. A method for producing an annular machine part having two concentric, metal machine elements, comprising the steps of:

establishing a uniform clearance between said machine elements so that there is no radial overlap between the machine elements;

forming a viscoelastic layer in said clearance;

joining at least one of the machine elements to a separately produced extension piece projecting from said at least one of the machine elements.

2. A method according to claim 1, wherein said at least one of the machine elements is provided with a predetermined surface finish before it is joined to the extension piece.

3. A method according to claim 1, wherein each of the machine elements is machined before being joined to the extension pieces.

4. A method according to claim 1, in which divergent metallic materials are used to produce the machine elements and the extension piece, wherein the materials are joined to one another using a resistance pulse welding method.

* * * * *